(12) United States Patent
Mehler et al.

(10) Patent No.: US 11,630,655 B2
(45) Date of Patent: Apr. 18, 2023

(54) MERGING DATA STRUCTURE DEFINITIONS

(71) Applicant: International Business Machines Corporation, Armonk, NY (US)

(72) Inventors: Jens Mehler, Sindelfingen (DE); Marco Kraemer, Sindelfingen (DE); Christoph Raisch, Gerlingen (DE); Beth A. Glendening, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/453,186

(22) Filed: Jun. 26, 2019

(65) Prior Publication Data

US 2020/0409675 A1    Dec. 31, 2020

(51) Int. Cl.
*G06F 8/51* (2018.01)
*G06F 8/76* (2018.01)
(Continued)

(52) U.S. Cl.
CPC .................. *G06F 8/51* (2013.01); *G06F 8/76* (2013.01); *G06F 8/31* (2013.01); *G06F 8/41* (2013.01)

(58) Field of Classification Search
CPC ..... G06F 8/51; G06F 8/76; G06F 8/24; G06F 8/30; G06F 8/38; G06F 8/42; G06F 8/61; G06F 8/65; G06F 9/445; G06F 3/0481; G06F 3/04817; G06F 3/04847; G06F 16/061; G06F 16/986; G06F 17/211; G06F 17/2247; G06F 17/2264; G06F 17/30864; G06F 17/30896; G06F 40/103;
(Continued)

(56) References Cited

U.S. PATENT DOCUMENTS

| 9,239,710 | B2 | 1/2016 | Araya et al. | |
| 2004/0123276 | A1* | 6/2004 | Knueven et al. | G06F 8/31 717/140 |

(Continued)

FOREIGN PATENT DOCUMENTS

CN    107577482 A    1/2018

OTHER PUBLICATIONS

Mell et al., "The NIST Definition of Cloud Computing", Recommendations of the National Institute of Standards and Technology, Sep. 2011, 7 pages (Year: 2011).*

(Continued)

*Primary Examiner* — Wei Y Zhen
*Assistant Examiner* — Mohammed N Huda
(74) *Attorney, Agent, or Firm* — Donald J. O'Brien

(57) ABSTRACT

Embodiments are disclosed for merging data structure definitions. The techniques include generating a first memory layout definition based on a first data structure definition that is written in a first programming language. The techniques further include generating a second memory layout definition based on a second data structure definition that is written in a second programming language. Additionally, the techniques include merging the first memory layout definition and the second memory layout definition into a merged memory layout definition. Further, the techniques include generating a merged data structure definition based on the merged memory layout definition.

17 Claims, 12 Drawing Sheets

(51) Int. Cl.
*G06F 8/41* (2018.01)
*G06F 8/30* (2018.01)

(58) Field of Classification Search
CPC .......... G06F 40/14; G06F 40/151; G06F 8/31;
H04L 67/34; H04W 84/12; H04W 84/18;
H04W 8/22; H04W 88/02
USPC ........................................................ 717/137
See application file for complete search history.

(56) References Cited

U.S. PATENT DOCUMENTS

| | | | |
|---|---|---|---|
| 2008/0005287 A1* | 1/2008 | Harvey et al. ............ | G06F 8/20 709/220 |
| 2010/0146491 A1* | 6/2010 | Hirano et al. ............ | G06F 8/73 717/137 |
| 2012/0151437 A1* | 6/2012 | Kneisel et al. ........... | G06F 8/51 717/114 |
| 2012/0167066 A1* | 6/2012 | Hawblitzel et al. ........................ | G06F 11/3624 717/146 |
| 2017/0102925 A1* | 4/2017 | Ali et al. .................. | G06F 8/30 |
| 2017/0139577 A1 | 5/2017 | Pesarese | |
| 2018/0300298 A1* | 10/2018 | Warila et al. ............ | G06F 8/65 |

OTHER PUBLICATIONS

Mell et al., "The NIST Definition of Cloud Computing", Recommendations of the National Institute of Standards and Technology, Sep. 2011, 7 pages.

* cited by examiner

```
406
struct a3_t {
  union {
    uint32_t a;        //PL8: 2 a bit(32)
    uint32_t a_new;
  };
  uint32_t b;          //PL8: 2 b bit(32)
  uint32_t c;          //PL8: 2 c bit(32)
  uint32_t d;          //PL8: 2 d bit(32)
  union {
    uint32_t e;        //PL8: 2 e bit(32)
    uint32_t reserved;
  };
} a3;
```

412 (first union) 414 (second union)

```
402
DCL 1 a3,
  2 a bit(32),
  2 b bit(32),
  2 c bit(32),
  2 d bit(32),
  2 e bit(32);
```
408

```
404
struct a3_t {
  uint32_t a_new;
  uint32_t b;
  uint32_t c;
  uint32_t d;
  uint32_t reserved;
} a3;
```
410

FIG. 4

MERGING DATA STRUCTURE DEFINITIONS

BACKGROUND

The present invention relates to data structure definitions, and more specifically, to merging data structure definitions.

Within a computer program, the computer language statements can be organized into different categories. Some computer language statements can be categorized as defining the functioning of the computer program. The functioning of the computer program can be the work that the computer program performs, such as performing arithmetic calculations and logical operations. Other computer language statements can be categorized as defining the data that the computer program uses in such calculations and operations. For example, these computer language statements can define variables that hold the data used in the arithmetic calculations and logical operations.

SUMMARY

Embodiments are disclosed for merging data structure definitions. The techniques include generating a first memory layout definition based on a first data structure definition that is written in a first programming language. The techniques further include generating a second memory layout definition based on a second data structure definition that is written in a second programming language. Additionally, the techniques include merging the first memory layout definition and the second memory layout definition into a merged memory layout definition. Further, the techniques include generating a merged data structure definition based on the merged memory layout definition.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 4 is an example of a first DSD, second DSD, and merged DSD, in accordance with embodiments of the present disclosure.

Figure 1:
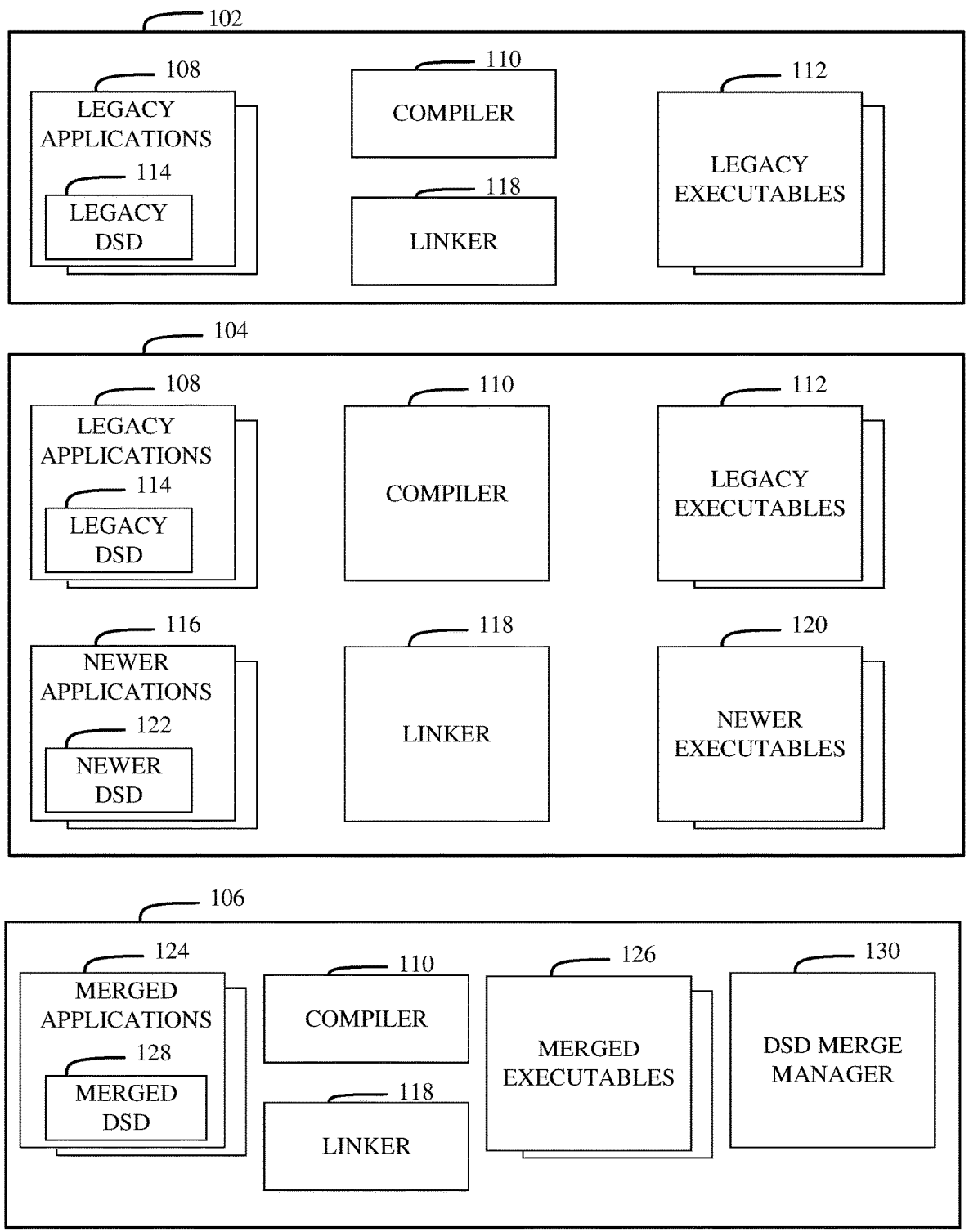
FIG. 1 is a block diagram of a legacy build environment, a combined build environment, and a converted build environment, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Many information systems are implemented using modern and legacy applications. A legacy application can be any older computer program, which can be implemented using twentieth century technology. For example, programming language one (PL/I) is a third-generation programming language. Third-generation programming languages, such as PL/I, COBOL, and BASIC, pre-date current programming languages, such as C++.

Human beings have been writing computer programs for several generations. As such, there are many information systems written in older languages. However, current computer applications are being written in object-oriented and other languages, such as C and C++. As such, in some cases, entire information systems, at a company, for example, that were originally developed in an older programming language, have been re-written in newer languages, such as C++. However, such efforts are costly.

Thus, in some cases, instead of re-writing older applications, the legacy applications have been maintained in the older languages while new applications have been developed in newer programming languages. However, maintaining systems integrated like this can be costly in the long-term because of the costs associated with supporting multiple languages. Further, finding software engineers to maintain legacy applications can be challenging because some of these languages were developed relatively long ago, making the labor pool for this skill limited.

As such, converting legacy applications to more current programming languages can reduce some of the costs associated with maintaining information systems, specifically, the build environments of information systems. However, in some cases, a build environment includes legacy applications and newer applications that have overlaps in data access. Having overlaps in data access means that two or more computer applications access the same data. However, each program can have a different data definition for the same data. Thus, having overlaps in data access can also mean that any converted program may not function correctly unless a common data definition can be generated that accommodates two potentially different definitions of the same data. Accordingly, embodiments of the present disclosure can take two computer applications written in two different languages, each having a different definition of the same data, and generate a new data definition in one of the languages. Herein, these data definitions are referred to as data structure definitions (DSDs). The DSDs can define the type and size of the data variables used by a computer application. Further, according to embodiments of the present disclosure, the newly generated DSD can be used by either of the applications, if written in the same language.

Advantageously, embodiments of the present disclosure can perform these techniques for any combination of different programming languages, and are not limited to the combination of a legacy and a newer application. Rather, combinations can include multiple legacy applications, multiples of newer applications. Further, embodiments of the present disclosure can generate combined DSDs in older and newer programming languages.

FIG. 1 is a block diagram of a legacy build environment 102, a combined build environment 104, and a merged build environment 106, in accordance with embodiments of the present disclosure. The legacy build environment 102 includes legacy applications 108, a compiler 110, legacy executables 112, and a linker 118. The legacy applications 108 can be source code versions of computer applications written in a computer programming language available at the time the legacy applications 108 were developed. For example, the legacy applications 108 can be written in PL/I. Computers are not capable of operating by reading source code. Thus, the compiler 110 converts the source code of the legacy applications 108 into binary code (not shown). The linker 118 can combine the compiled sources from the compiler 110 to generate the legacy executables 112. The legacy executables 112 are binary code, which is the code that computers use to execute the functionality of computer applications. Additionally, each of the legacy applications 108 includes a legacy DSD 114. The legacy DSD 114 can be a data definition for the legacy applications 108 that is written in the source code of the legacy applications 108.

The combined build environment 104 can represent a newer state of the legacy build environment 102 where the legacy applications 108 are maintained in their original programming language. Additionally, newer applications 116 that use the same data inputs as the legacy applications can be written. However, the newer applications 116 can be written in a different programming language than the legacy applications 108. Thus, the combined build environment 104 includes the legacy applications 108, compiler 110, legacy executables 112, newer applications 116, a linker 118, and newer executables 120. Each of the newer applications 116 can be related with one of the legacy applications 108 by the data each of the applications uses. Thus, similar to the legacy applications 108, the newer applications 116 can include a DSD that is the same size as the legacy DSD 114 of the related legacy application 108. However, the newer applications 116 may not use all of the data inputs that the related legacy application 108 uses. As such, the newer application 116 can include a newer DSD 122 that merely references the data that the newer application 116 uses. Also, similar to the compiler 110 generating legacy executables 112 from the legacy applications 108, the linker 118 can generate newer executables 118 from the newer applications 116.

Maintaining any build environment can include costs for purchasing and/or licensing the software that runs on the computers of the build environment. For example, having legacy applications 108 and newer applications 116 written in two different languages in the combined build environment 104 means having the compiler 110 and linker 118 to generate the associated executables. Having the compiler 110 and the linker 118 incurs the associated purchasing and/or licensing costs. As such, reducing the number of computer programming languages that are supported on a build environment can reduce the costs for the build environment.

For example, the merged build environment 106 can include merged applications 124, linker 118, and merged executables 126. The merged applications 124 can be merged source code versions of the legacy applications 108 and the newer applications 116 that are written in the same computer programming language as the newer applications 116. The linker 118 can generate the merged executables 126 from the merged applications 124. Because the merged applications 124 can include data references from both the legacy DSD 114 and the newer DSD 122, the merged applications 124 can include a merged DSD 128 with the data references from both of the legacy DSD 114 and the newer DSD 122. Because the merged build environment 106 merely supports one programming language, the merged build environment 106 does not include both the compiler 110 and the linker 118. Advantageously, the costs associated with generating executables for the merged build environment are less than those for the combined build environment 104. The merged build environment 106 can also include a DSD merge manager 130. According to embodiments of the present disclosure, the DSD merge manager 130 can merge the legacy DSD 114 and the newer DSD 122 into the merged DSD 128. The DSD merge manager 130 in this example is included in the merged build environment 106. However, in some embodiments, the DSD merge manager 130 may not be included in a build environment.

Figure 2:
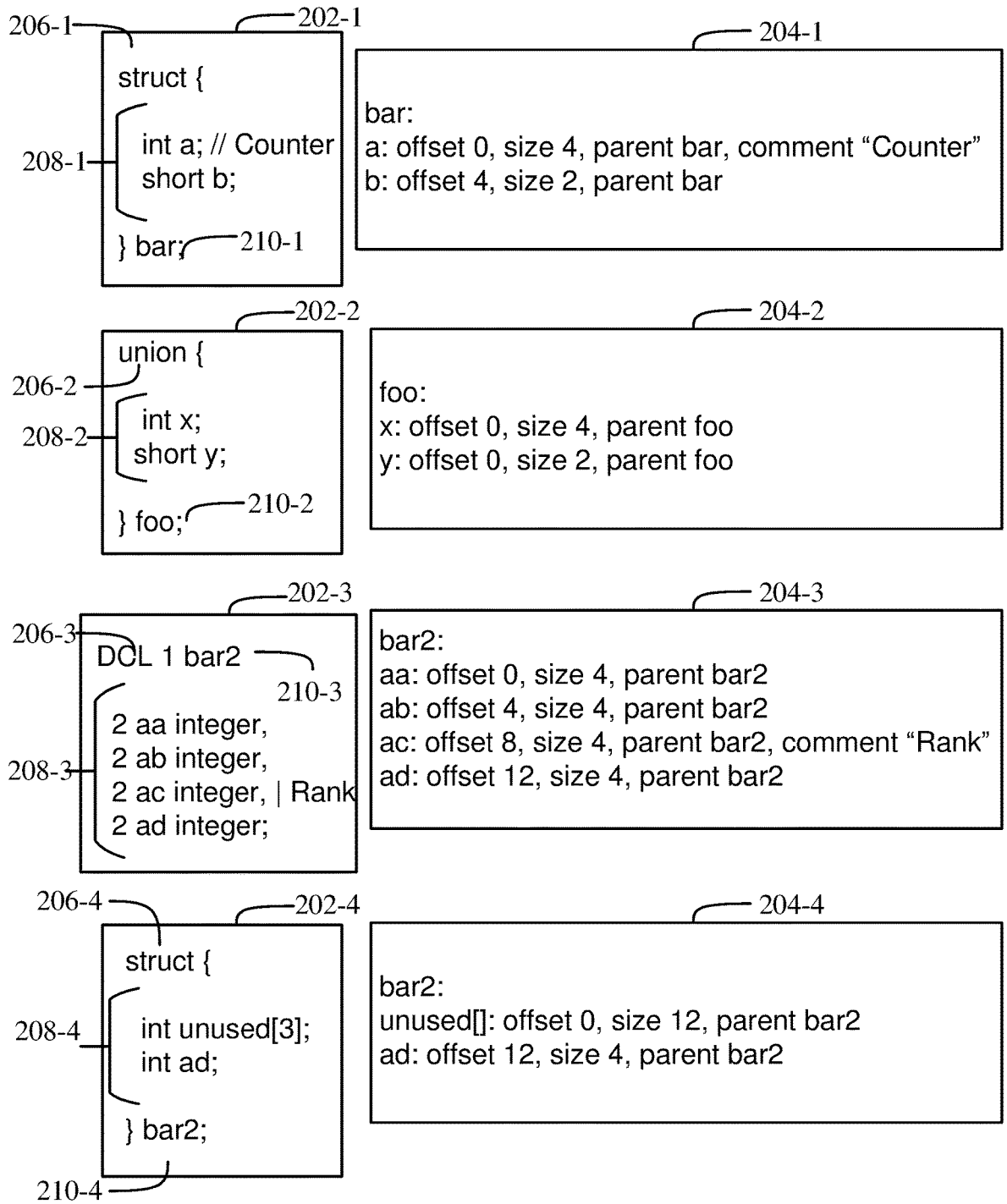
FIG. 2 is a block diagram of example data structure definitions (DSDs) and their corresponding memory layouts, in accordance with embodiments of the present disclosure.

FIG. 2 is a block diagram of example DSDs 202-1 through 202-4 and their corresponding memory layouts 204-1 through 204-4, in accordance with embodiments of the invention. The DSD 202-1 through 202-4 are computer program language statements that define the data used by a computer application, such as the legacy applications 108 and newer applications 116 described with respect to FIG. 1. Referring back to FIG. 2, memory layouts, such as the memory layouts 204-1 through 204-4 can represent how the data defined in the DSDs 202-1 through 202-4 is arranged in computer memory once their corresponding applications are compiled, or linked, into executables.

For example, the DSD 202-1 represents an example DSD in the C++ programming language. The DSD 202-1 includes a DSD type 206-1, a variable list 208-1, and a DSD name 210-1. The DSD type 206-1 indicates whether the DSD 202-1 defines a structure or a union. A structure DSD type can include one or more data variables in the variable list 208-1 that each occupy a unique location in memory. In contrast, a union DSD type can include one or more data variables in the variable list 208-1 that serve as alternative names for the same memory location. The DSD name 210-1, "bar," can be a unique label for the DSD 202-1.

As shown, the DSD type 206-1 is labeled, "struct," indicating the DSD 202-1 is a structure DSD type. Each line within the variable list 208-1 defines a data variable with a variable type and a variable name. For example, the first variable in the variable list 208-1 includes a variable type, "int," and a variable name, "a." The variable type identifies the type of data that is stored in the data variable. For example, the variable type can include integers, short integers, real numbers, strings, Boolean variables, and the like. In this example, the variable type, "int," indicates that variable, "a," is an integer. The definition of variable, "a," also includes a comment, "// stuff." Computer programming languages can include a comment feature for annotating the computer code. The comments are non-functional statements in the computer code that can document a computer application. In other words, the computer processor does not execute the comments. The comments are merely present in the code for annotation. The comment, "counter," shown here, can indicate that the variable, a, is used as a counter in this computer application. Different computer programming languages use different conventions for putting comments in the source code. In the C++ programming language, the characters, "//," are used to indicate the beginning of a comment.

The second variable definition in the variable list 208-1 includes a variable type, "short," and a variable name, "b." The variable type, "short," indicates that variable "b" is a short integer. Short integers can be integers that occupy a smaller portion of memory than other integers. In this example, integers occupy four bytes of memory and short integers occupy two bytes of memory.

The memory layout 204-1 corresponds to the DSD 202-1, indicating where in memory each of the variables in the bar structure of the DSD 202-1 is located. The memory layout 204-1 includes the name 210-1 of the DSD 202-1, "bar," and the layout definition for each variable in the variable list 208-1. The layout definition can include the variable name, the variable offset, the variable size, the parent name, and a comment (if applicable). The variable offset can indicate where in relation to the beginning of the DSD 202-1 each of the variables is located. The variable offset is related to the order in which the variable is listed in the variable list of the variable list 208-1, and the size of the preceding variables. For example, the variable, "a," is the first variable in the variable list 208-1. Hence, variable, "a," is located at offset, 0. An offset of 0 indicates that this variable is located at the first memory address in the bar structure of the DSD 202-1. The size of a variable can be dependent upon the variable type or can be expressly declared. In this example, the DSD 202-1 defines the variable, "a," as an integer type. Hence, the size of the variable, "a," is 4 bytes. The parent name indicates the name 210-1 of the DSD 202-1 to which the variable belongs. In this example, variables, "a," and, "b," belong to the parent, bar. According to embodiments of the present disclosure, the memory layout 204-1 can also include the comments from the DSD 202-1. By copying the comments to the memory layout 204-1, it is possible to generate a new DSD from the memory layout 204-1 without losing any potentially useful comments from the original DSD 202-1.

Further, the variable, "b," is the second variable in variable list 208-1. Hence, variable, "b," is located at the next available memory location after the variable, "a." As shown, variable, "a," has a size of 4 bytes. Accordingly, the next available memory location after the variable, "a," is 4. Hence, the address offset of variable, "b," is 4. An offset of 4 indicates that variable, "b," is located at the memory address that is 4 bytes beyond the first memory address in the bar structure. Further, the variable list 208-1 defines the variable, "b," as a short integer type. Hence, the size of the variable, "b," is 2 bytes.

The example DSD 202-2 represents an example DSD in the C++ programming language. As shown, the DSD type 206-2 is labeled, "union," indicating the DSD 202-2 is a union DSD type. The first variable in the variable list 208-2 includes a variable type, "int," and a variable name, "x." The second variable definition in the variable list 208-2 includes a variable type, "short," and a variable name, "y." The variable type, "short," indicates that variable "b" is a short integer.

The memory layout 204-2 corresponds to the DSD 202-2. The memory layout 204-2 includes the name 210-2 of the DSD 202-2, "foo," and the layout definition for each variable in the variable list 208-2. The variable, "x," is the first variable in the variable list 208-2. Hence, variable, "x," is located at offset, 0. An offset of 0 indicates that this variable is located at the first memory address in the foo structure of the DSD 202-2. In this example, the variable list 208-2 defines the variable, "x," as an integer type. Hence, the size of the variable, "x," is 4 bytes. The parent name indicates the name 210-2 of the DSD 202-2 to which the variable belongs. In this example, variables, "x," and, "y," belong to the parent, foo.

Further, the variable, "y," is the second variable in variable list 208-2. However, the parent, foo, is a union DSD type. Hence, variable, "y," can serve as an alternative name for the same memory location as the variable, "x." Thus, the variable, 'y," is located at the same offset as variable, "x," offset, 0 of parent, foo. Further, the variable list 208-2 defines the variable, "y," as a short integer type. Hence, the layout definition for the variable, "y," indicates the size of the variable is 2 bytes.

The example DSD 202-3 represents an example DSD in the PL/8 programming language. In PL/8, the DSD type 206-3 can be defined with the "DCL" statement, which is short for "declaration," and indicates this is a structure DSD type. The variables in the variable list 208-3 are named, "aa" through "ad," and are all integer variable types. Further, the number, "2," preceding the variable names in the variable list 208-3 specifies the hierarchy within a structure or union on PL/I. This can be used to created nested structure, such as shown in SOURCE CODE EXAMPLE 1, where each hierarchy type represents a different level of the nest:

| SOURCE CODE EXAMPLE 1 |
|---|
| Dcl 1a bit(64),<br>  2 b bit(32),<br>    3 c bit(16),<br>    3 d bit(16),<br>  2 e bit(32); |

In the SOURCE CODE EXAMPLE 1, variable a is 64 bits and represents the top of the hierarchy. The variable a includes the remaining variables within this hierarchy, specifically within variables b and e, which are each at level 2 of the hierarchy, and each 32 bits long. Variable b includes two variables, c and d, which are each at level 3 of the hierarchy, and each 16 bits long.

The memory layout 204-3 corresponds to the DSD 202-3. The memory layout 204-3 includes the name 210-3 of the DSD 202-3, "bar2," and the layout definition for each variable in the variable list 208-3. The variable, "aa," is the first variable in the variable list 208-3. Hence, variable, "aa," is located at offset, 0. An offset of 0 indicates that this variable is located at the first memory address in the bar2 structure of the DSD 202-3. In this example, the variable list 208-3 defines the variable, "aa," as an integer type. Hence, the size of the variable, "aa," is 4 bytes. In this example, variables, "aa," through, "ad," all belong to the parent, bar2.

All of the variables in the variable list 208-3 are integers. As such, each of the variables has an offset of 4 bytes beyond the offset of the preceding variable. Hence, the variable, "ab," is at offset 4, variable, "ac," is at offset 8, and the variable, "ad," is at offset 12. Additionally, because all of the variables in the variable list 208-3 are integers, the size of the variables, "aa," through, "ad," is 4. The layout definition for the variable, "ac," also includes the comment, "Rank," from the DSD 202-3.

According to embodiments of the present disclosure, the DSD 202-3 can represent the DSD of a legacy application 108, e.g., legacy DSD 114, coded in the PL/8 language. If this legacy application 108 is related to a newer application 116, the DSD 202-4 can represent the newer DSD 122 of the related newer application 116. As stated previously, the newer application 116 can use the same data inputs as a related legacy application 108. However, the newer application 116 may not use all the variables from the variable list of the legacy DSD 114.

For example, the DSD 202-4 the DSD type 206-4 and name 210-4, labeled, "struct," and, "bar2," respectively, are the same as the DSD type and name shown in DSD 202-3. However, the variable list 208-4 differs from the variable list 208-3. The variable list 208-4 includes an array of 3 integers, "int unused[3]," that precede the integer variable, "ad," which is shared between the variable list 208-3 and variable list 208-4. In this example, the related newer application 116 can merely use the one variable, "ad," from the original legacy application 108. Thus, instead of creating a DSD that includes all the variables from the legacy application, the software engineer writing the related newer application 116 can create a placeholder for the first three variables, e.g., the "unused" array. Further, the software engineer can leave out the comment for the variable, "ac," from the variable list 208-3.

Figure 3:
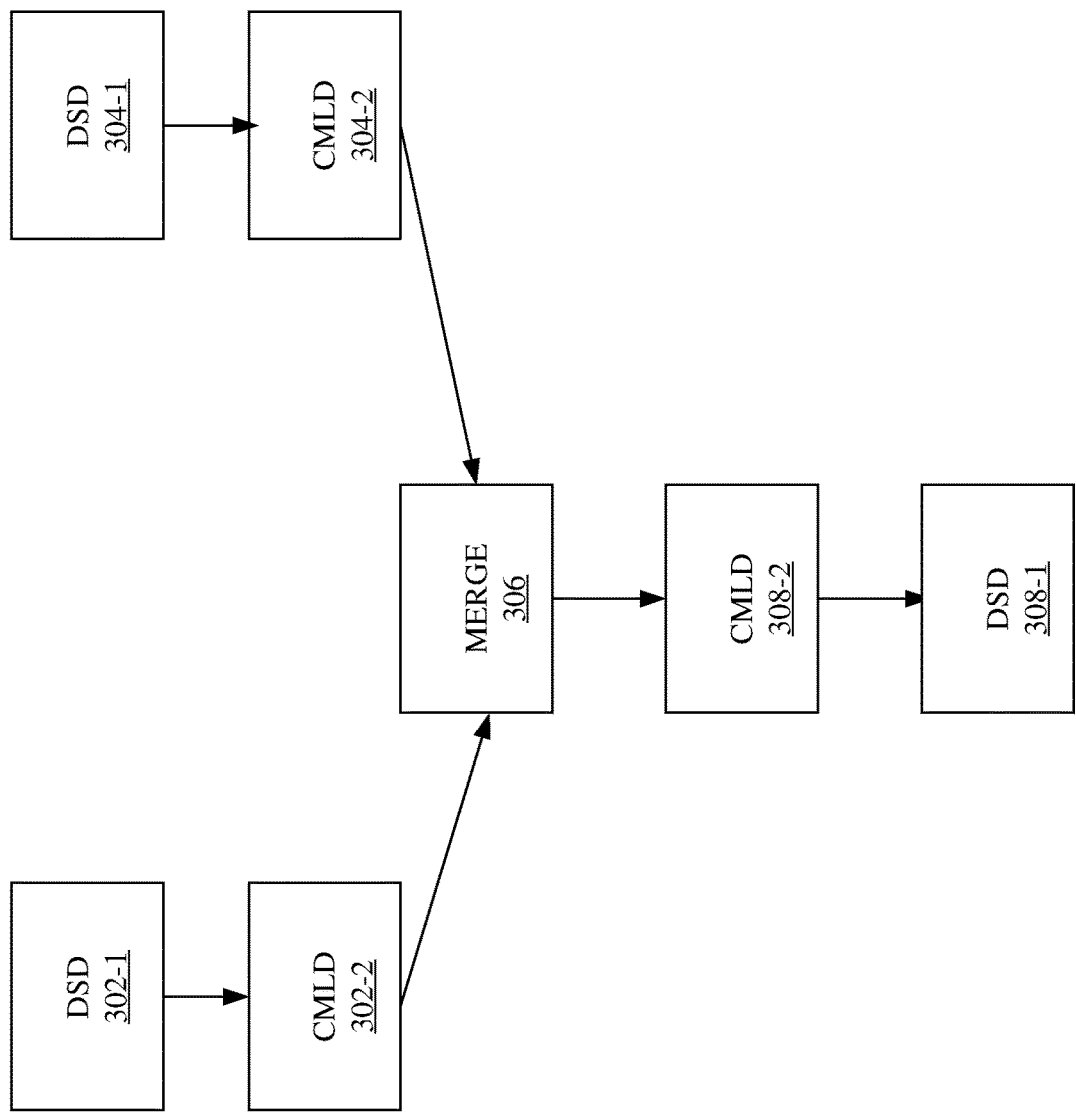
FIG. 3 is a block diagram illustrating the merger of DSDs, in accordance with embodiments of the present disclosure.

FIG. 3 is a block diagram illustrating the merger of DSDs 302-1 and 304-1, in accordance with embodiments of the present disclosure. The DSD 302-1 can represent the DSD for a legacy application, such as the legacy applications 108, described with reference to FIG. 1. Referring back to FIG. 3, the DSD 302-1 can be written in a first programming language, for example, the PL/8 programming language. Additionally, the DSD 304-1 can represent the DSD for a different application, such as the newer applications 116, described with reference to FIG. 1. Referring back to FIG. 3, the DSD 304-1 can be written in a second programming language, different from the first programming language of the DSD 302-1. The second programming language can be, for example, the C++ programming language.

The complete memory layout definitions (CMLDs) 302-2, 304-2 can represent the memory layouts that correspond to the DSDs 302-1, 304-1, respectively. The arrows from DSDs 302-1, 304-1 to CMLDs 302-2, 304-2, respectively can represent the generation of CMLDs 302-2, 304-2 from the DSDs 302-1, 304-1. More specifically, embodiments of the present disclosure can generate the CMLDs 302-2, 304-2 from the DSDs 302-1, 304-1, respectively. Further, block 306 can represent a merge process that merges the CMLDs 302-2, 304-2 into a single merged CMLD 308-2. In embodiments of the present disclosure, the merge process at block 306 can generate the merged CMLD 308-2 while preserving memory offsets and structure sizes from the CMLDs 302-2, 304-2. Additionally, the merge process at block 306 can combine any comments from the original DSDs 302-1, 304-1 to be included in the merged CMLD 308-2. The merged DSD 308-1 can be a DSD in either the first or second programming language that can be generated from the merged CMLD 308-2. In embodiments of the present disclosure, memory offsets, structure sizes, and comments from the merged CMLD 308-2 can be preserved in the merged DSD 308-1.

FIG. 4 is an example of a first DSD 402, second DSD 404, and merged DSD 406, in accordance with embodiments of the present disclosure. The first DSD 402 and the second DSD 404 can represent DSDs from, respectively, a legacy application and a newer application that can process the same data inputs. The first DSD 402 is a DSD that is written in the PL/8 programming language. In the PL/8 programming language, the statement, DCL, is the declaration of a component of the DSD. As shown, the DCL statement includes two parameters, an integer, 1, and a name, "a3." The integer indicates the number of DSDs declared, and the name is a reference for the variables in variable list 408. The reference, a3, can be used in functional programming language statements that perform logic, arithmetic, and other control operations of a computer applications. Each variable in the DSD 402 is represented in one line of the variable list 408. In the PL/8 programming language, a variable is defined in the following format: byte size, name, and data type. As shown, the DSD 402 defines five variables, with names, "a" through "e." The type of each variable, "bit(32)," means the variable is a binary number that is 32 digits long. As such, the DSD 402 represents a data area that is 5×32=160 bits long.

The second DSD 404 is a DSD that is written in the C++ programming language. The second DSD 404 includes the typename, "a3_t," following the "struct" declaration in the first line of the second DSD 404. The typename of the structure enables a reference to the structure that can be reused after the declaration, or even within the structure itself.

Because the DSD 402 and the DSD 404 reference the same data inputs, the size of the second DSD 404 is the same size as the first DSD 402. As shown, the second DSD 404 includes a variable list 410, which, similar to the first DSD 402 includes five variables, named a_new, b, c, d, and reserved. Additionally, each of the variables in the variable list 410 are of type uint32_t. The uint32_t data type is for 32-bit binary variables. As such, the second DSD 404 is the same size as the first DSD 402, 5×32=160 bits long.

While the first DSD 402 and the second DSD 404 do use some of the same variable names, other names are different. Specifically, first DSD 402 and second DSD 404 share the variable names "b" through "d." However, the first DSD 402 uses the variable names, "a," and, "e," where the second DSD 404 uses the names, "a_new," and, "reserved," respectively. As such, when merging the first DSD 402 and second DSD 404, both sets of variable names can be preserved through the use of the union DSD type.

This example shows the merged DSD 406 in C++ source code, which uses brackets, "{ }," to delimit sections of code. According to embodiments of the present disclosure, the size of the merged DSD 406 is the same size, and has the same memory layout, as the first DSD 402 and the second DSD 404. As such, the first variable in the merged DSD 406 includes references for the first variable from both the first DSD 402 and the second DSD 404 in a union statement 412. Because the first variable from the first DSD 402 and the second DSD 404 have different names, the union statement 412 is used to make both names available to reference the associated location in memory. The second through fourth variables in the first DSD 402 and the second DSD 404 use the same names. Thus, these variables are merely listed after the union of the first variable names. Further, the fifth variable from the first DSD 402 and the second DSD 404 have different names. As such, the union statement 414 is used to make both names available to reference the associated location in memory.

Additionally, each of the union statements 412, 414 include comments describing the original source code definition of each variable. According to embodiments of the present disclosure, the DSD merge manager 130 can automatically copy the source code definition of a legacy application into a comment of the translated source code definition. Such comments can be useful for developers trying to find the translated and merged parts of the combined source code more easily when they only know the PL/I code well.

Figure 5:
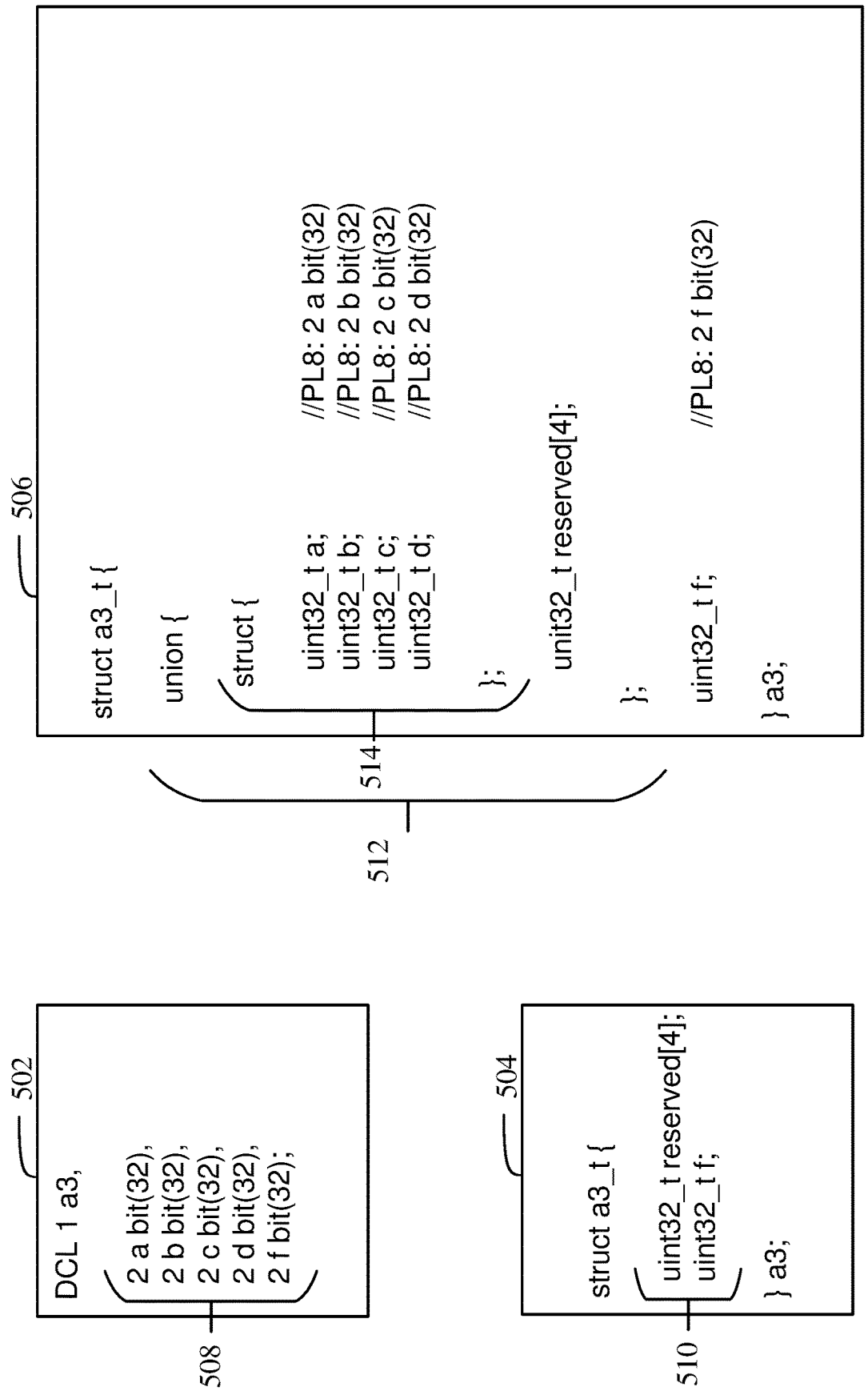
FIG. 5 is an example of a first DSD, second DSD, and merged DSD, in accordance with embodiments of the present disclosure.

FIG. 5 is an example of a first DSD 502, second DSD 504, and merged DSD 506, in accordance with embodiments of the present disclosure. The first DSD 502 and the second DSD 504 can represent DSDs from a legacy application and a newer application that can process the same data inputs. The first DSD 502 is a DSD that is written in the PL/8 programming language. As shown, the DCL statement for the first DSD 502 includes two parameters, an integer, 1, and a name, "a3." The integer indicates the number of DSDs declared, and the name is a reference for the variables in variable list 508. Each variable in the DSD 502 is represented in one line of the variable list 508. As shown, the DSD 502 defines five variables, with names, "a" through "d," and, "f." The type of each variable, "bit(32)," means the variable is a binary number that is 32 digits long. As such, the DSD 502 represents a data area that is 5×32=160 bits long.

The second DSD 504 is a DSD that is written in the C++ programming language. Because the DSD 502 and the DSD 504 reference the same data inputs, the size of the second DSD 504 is the same size as the first DSD 502. As shown, the second DSD 504 includes a variable list 510, which, includes an array of four 32-bit entries, named, "reserved[ ]," and a 32-bit variable, named, "f." As such, the second DSD 504 is the same size as the first DSD 502, 5×32=160 bits long.

In this example, the first DSD 502 and the second DSD 504 only share the variable name, "f" for the last memory location in the variable lists. However, in place of the "a," through, "d" variables in the first DSD 502, the second DSD 504 uses the reserved[ ] array as a placeholder. Thus, when merging the first DSD 502 and second DSD 504, the reserved[ ] array and the "a" through "d" variable names can be preserved through the use of the union statement 512. As shown, the union statement 512 includes both a struct statement 514 that includes the "a" through "d" variables, and the reserved[ ] array.

This example shows the merged DSD 506 in C++ source code. As shown, the merged DSD 506 includes a union statement to preserve the references for the reserved[ ] array and the "a" through "d" variable names from the first DSD 502 and the second DSD 504. Further, the last variable, "f," is merely listed after the union.

Figure 6:
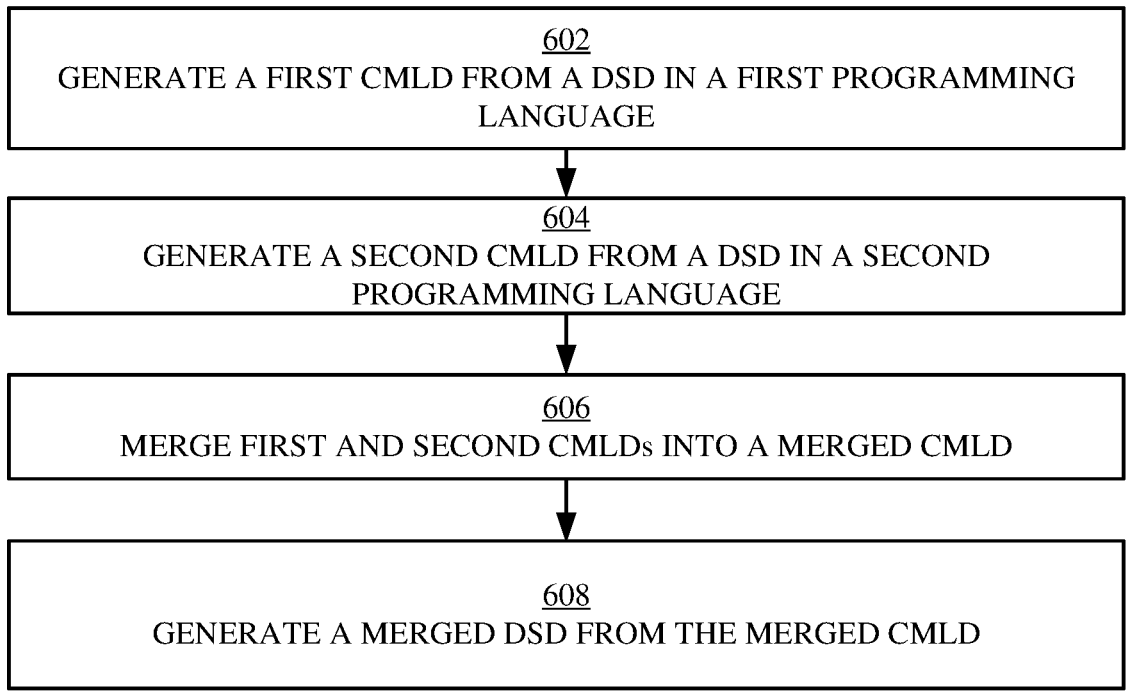
FIG. 6 is a flowchart of an example method for merging DSDs, in accordance with embodiments of the present disclosure.

FIG. 6 is a flowchart of an example method 600 for merging DSDs, in accordance with embodiments of the present disclosure. The method 600 can be performed by a DSD merge manager, such as the DSD merge manager 130 described with respect to FIG. 1. Referring back to FIG. 6, at block 602, the DSD merge manager 130 can generate a complete memory layout definition (CMLD) for a DSD in a first programming language. The CMLD can define the physical arrangement of the variables defined in the DSD, and include any comments from the DSD. For example, the DSD merge manager 130 can generate a CMLD, such as the CMLD 302-2, from a DSD, such as the DSD 302-1, described with reference to FIG. 3.

At block 604, the DSD merge manager 130 can generate a complete memory layout definition (CMLD) for a DSD in a second programming language. The second programming language can be different from the first programming language. For example, the DSD merge manager 130 can generate a CMLD, such as the CMLD 304-2, from a DSD, such as the DSD 304-1, described with reference to FIG. 3.

At block 606, the DSD merge manager 130 can merge the generated CMLDs into a merged CMLD, such as the CMLD 308-2 described with reference to FIG. 3. The merged CMLD 308-2 can include layout definitions for variables that share memory locations and any comments included in the CMLDs 302-2, 304-2.

At block 608, the DSD merge manager 130 can generate a merged DSD, such as the merged DSD 308-1, from the merged CMLD 308-2. The DSD merge manager 130 can generate the merged DSD 308-1 in either of the first programming language or the second programming language.

Figure 7A:
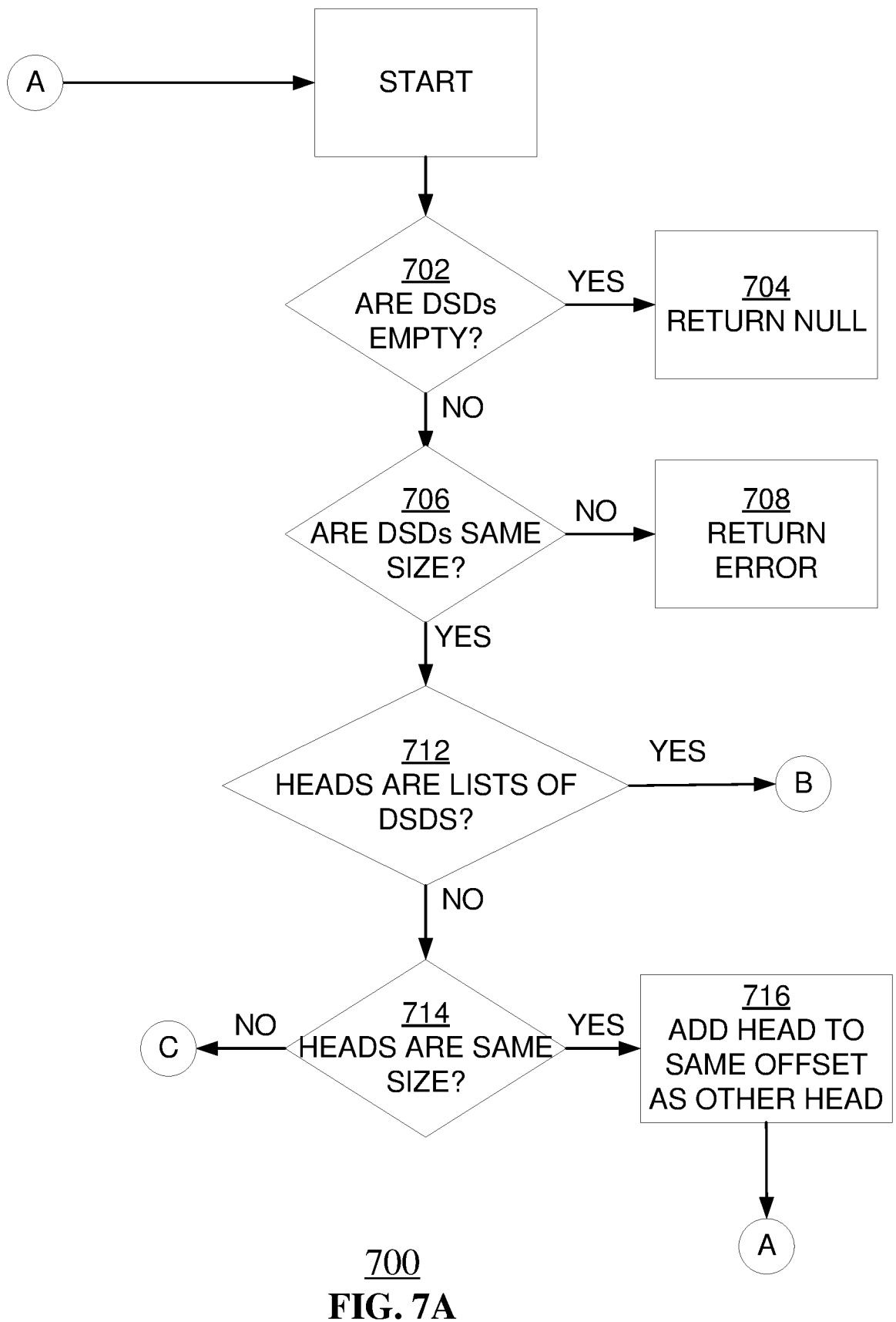
FIGS. 7A-7C illustrate a flowchart of an example method for merging DSDs, in accordance with embodiments of the present disclosure.
Figure 7B:
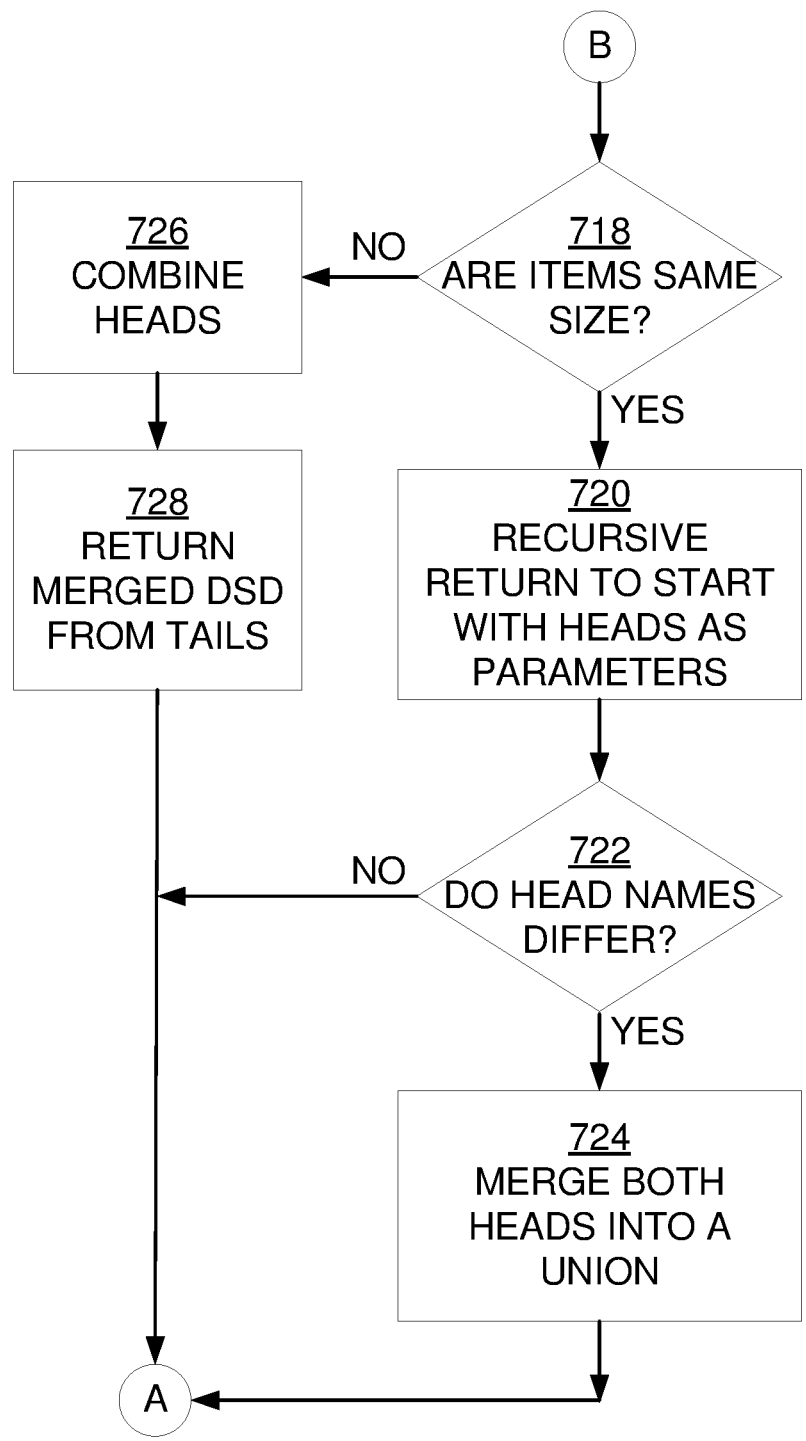
Figure 7C:
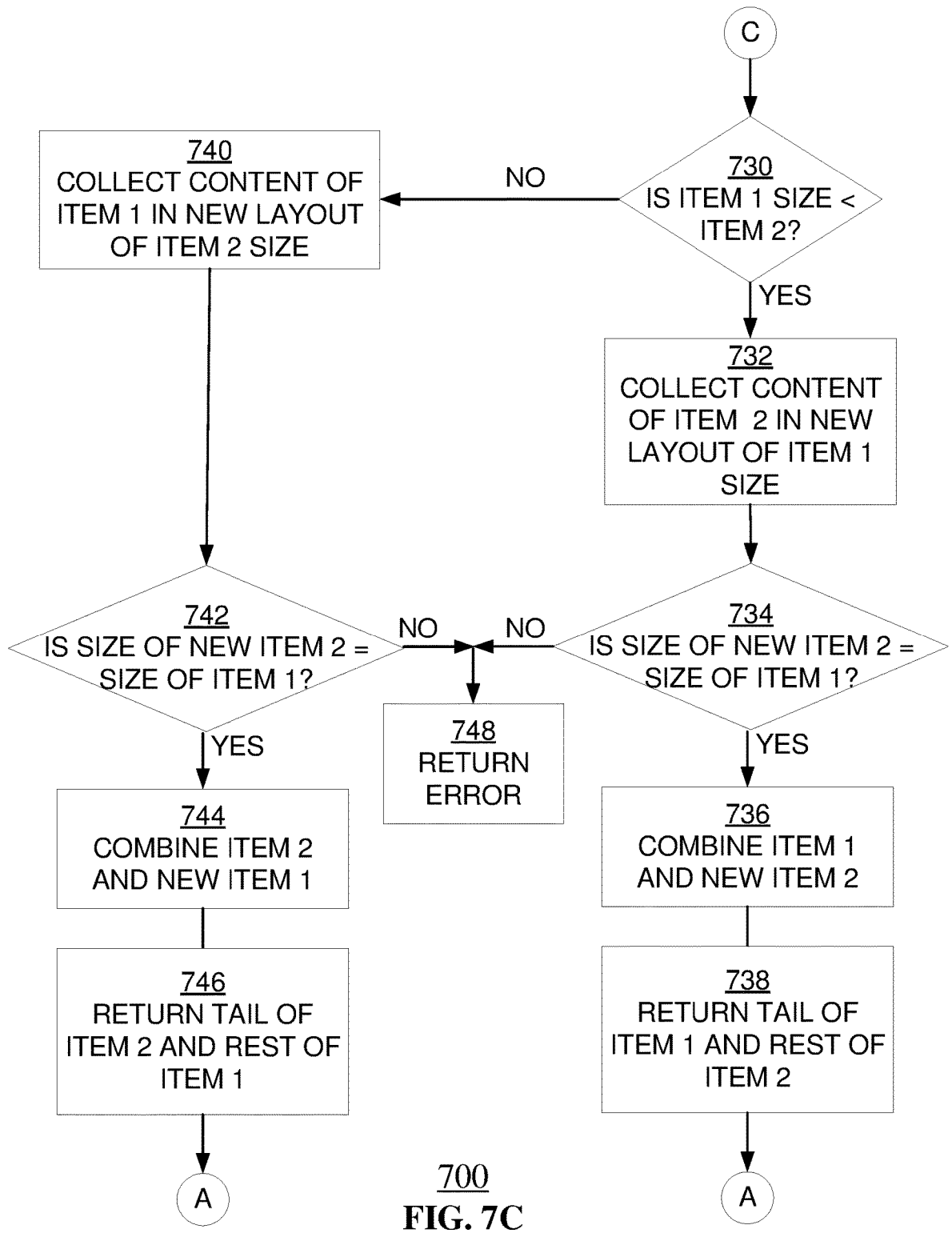

FIGS. 7A-7C illustrate a flowchart of an example method 700 for merging DSDs, in accordance with embodiments of the present disclosure. The method 700 can be performed by a DSD merge manager, such as the DSD merge manager 130 described with reference to FIG. 1. Referring back to FIGS. 7A-7C, the method 700 is recursive, meaning that the DSD merge manager 130 can apply the techniques of the method 700 recursively as the DSD merge manager steps through each line of a DSD.

Accordingly, at block 702, the DSD merge manager 130 can determine whether the complete memory layout definitions (CMLDs), such as the DSDs 302-1, 304-1, are empty. If the DSDs 302-1, 304-1 are empty, control can flow to block 704, where the DSD merge manager 130 can return a null result. If the DSDs 302-1, 304-1 are not empty, control can flow to block 706.

At block 706, the DSD merge manager 130 can determine whether the DSDs 302-1, 304-1 are the same size. If the DSDs 302-1, 304-1 are not the same size, control can flow to block 708. At block 708, the DSD merge manager 130 can return an error. If the DSDs 302-1, 304-1 are the same size, control can flow to block 710.

At block 712, the DSD merge manager 130 can determine whether the heads of the lists are DSDs. The heads of the lists can be DSDs if the item is a superstructure. A superstructure can be a grouping of variables, such as in the union and struct statements of the C++ programming language. If the heads of the lists are DSDs, control flows to placeholder B, which is described in greater detail with reference to FIG. 7B. If the heads of the lists are not DSDs, control flows to block 714.

At block 714, the DSD merge manager 130 determines whether the heads are the same size. If the heads are not the same size, control flows to placeholder C, which is described in greater detail with respect to FIG. 7C. If the heads are the same size, control flows to block 716.

At block 716, the DSD merge manager 130 adds the head to the same offset as the other head. In other words, having the same size means that both items from the two different DSDs 302-1, 304-1 occupy the same memory location. Accordingly, the items are placed at the same offset. Control then flows to placeholder A, which returns to the start of the method 700 for the next item in the DSDs 302-1, 304-1.

FIG. 7B illustrates a flowchart of the method 700, in accordance with embodiments of the present invention. Control of the method 700 flows to the blocks of FIG. 7B when the heads are lists of DSDs. Accordingly, at block 718, the DSD merge manager 130 determines whether the items are the same size. If the items are the same size, control flows to block 720. If the items are not the same size, control flows to block 726.

At block 720, the DSD merge manager 130 can perform a recursive return to the start of the method 700 with the heads of the items as parameters. Returning to the start in this way can enable the DSD merge manager 130 to parse the individual items of the enclosing superstructure.

At block 722, the DSD merge manager 130 can determine whether the head names differ. If the head names differ, control can flow to block 724, where the DSD merge manager 130 can merge both heads within a union statement, such as the union statement in the C++ programming language. Control can then flow to placeholder A, which is described in greater detail with respect to FIG. 7A.

At block 726, the DSD merge manager 130 can combine the heads of the superstructure items. Combining the heads means to put them into a union. Control can then flow to placeholder A, which is described in greater detail with respect to FIG. 7A.

FIG. 7C illustrates a flowchart of the method 700, in accordance with embodiments of the present invention. Control of the method 700 flows to the blocks of FIG. 7C when the items of the DSD 302-1, 304-1 contain superstructures of different sizes.

At block 730, the DSD merge manager 130 can determine whether the memory size of item 1 (from DSD 302-1) is less than the memory size of item 2 (from DSD 304-1). If the memory size of item 1 is less than the memory size of item 2, control can flow to block 732. If the memory size of item 1 is not less than the memory size of item 2, control can flow to block 740.

At block 732, the DSD merge manager 130 can collect the content of item 2 in a new layout that has the same memory size as item 1. If the two inputs differ in size the DSD merge manager 130 can split the larger of the two inputs into a size that fits, and returning the matching part with the remainder of the field.

At block 734, the DSD merge manager 130 can determine whether the size of the new item 2 (with the collected content described in block 732) is equal to the size of item 1. If not, there is an error. Accordingly, control flows to block 748, where the DSD merge manager 130 can return an error. If the size of the new item 2 is equal to the size of item 1, control can flow to block 736.

At block 736, the DSD merge manager 130 can combine item 1 with the new item 2. Additionally, at block 738, the DSD merge manager 130 can return the tail of item 1 and the remaining portions of item 2 (not collected in the new item 2) as parameters. Control can flow to placeholder A, which is described in greater detail with respect to FIG. 7A.

At block 740, the DSD merge manager 130 can collect the content of item 1 in a new layout that has the same memory size as item 2. If the two inputs differ in size the DSD merge manager 130 can split the larger of the two inputs into a size that fits, and returning the matching part with the remainder of the field.

At block 742, the DSD merge manager 130 can determine whether the size of the new item 1 (with the collected content described in block 740) is equal to the size of item 2. If not, there is an error. Accordingly, control flows to block 748, where the DSD merge manager 130 can return an error. If the size of the new item 1 is equal to the size of item 2, control can flow to block 742.

At block 742, the DSD merge manager 130 can combine item 2 with the new item 1. Additionally, at block 744, the DSD merge manager 130 can return the tail of item 2 and the remaining portions of item 1 (not collected in the new item 1) as parameters. Control can flow to placeholder A, which is described in greater detail with respect to FIG. 7A.

Figure 8:
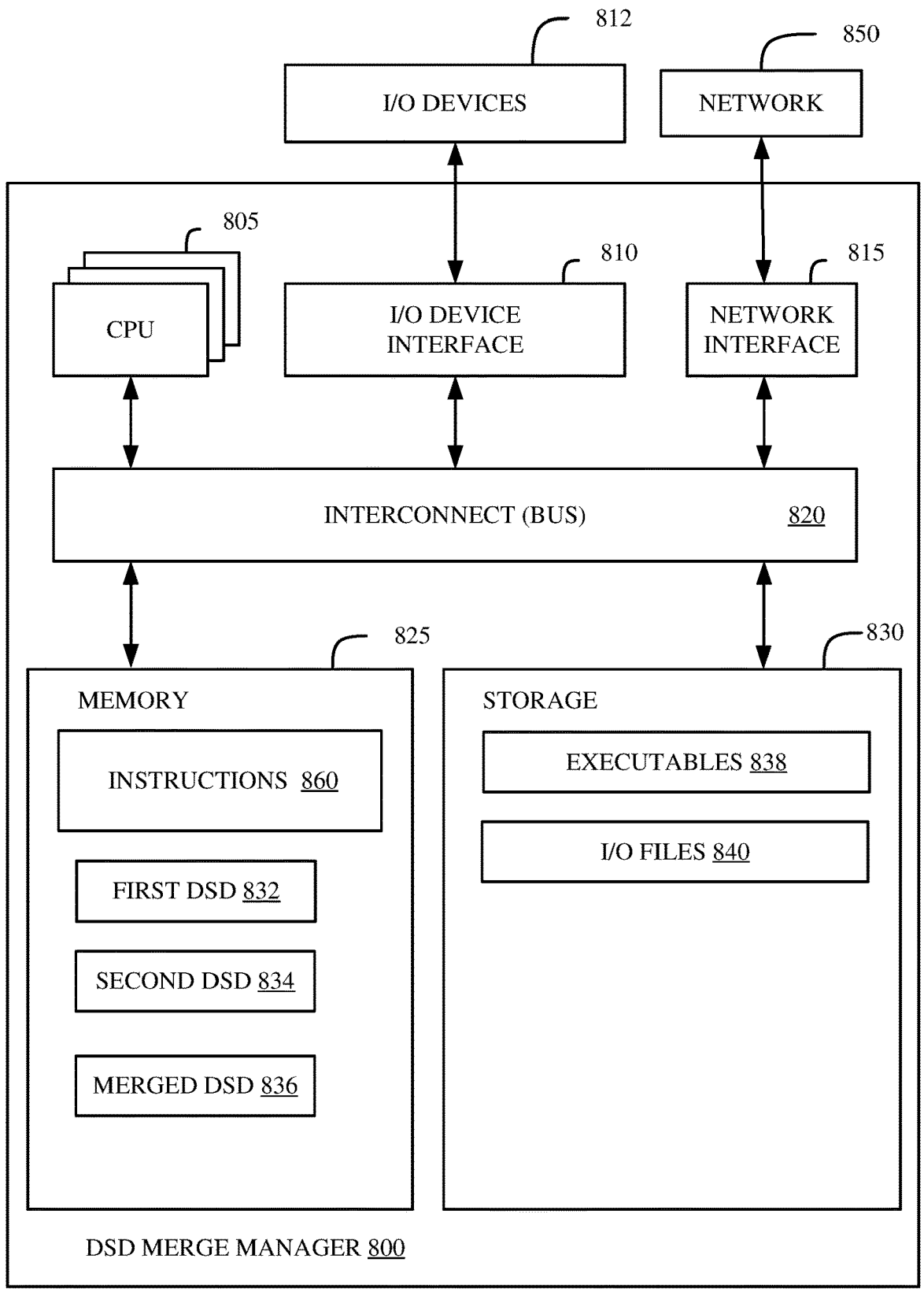
FIG. 8 is a block diagram of an example DSD merge manager, in accordance with embodiments of the present disclosure.

FIG. 8 is a block diagram of an example DSD merge manager 800, in accordance with embodiments of the present disclosure. In various embodiments, the DSD merge manager 800 can perform the methods described in FIGS. 6 and 7A-7C and/or the functionality discussed in FIGS. 1-5. In some embodiments, the DSD merge manager 800 provides instructions for the aforementioned methods and/or functionalities to a client machine such that the client machine executes the method, or a portion of the method, based on the instructions provided by the DSD merge manager 800. In some embodiments, the DSD merge manager 800 comprises software executing on hardware incorporated into a plurality of devices.

The DSD merge manager 800 includes a memory 825, storage 830, an interconnect (e.g., BUS) 820, one or more CPUs 805 (also referred to as processors 805 herein), an I/O device interface 810, I/O devices 812, and a network interface 815.

Each CPU 805 retrieves and executes programming instructions stored in the memory 825 or the storage 830. The interconnect 820 is used to move data, such as programming instructions, between the CPUs 805, I/O device interface 810, storage 830, network interface 815, and memory 825. The interconnect 820 can be implemented using one or more busses. The CPUs 805 can be a single CPU, multiple CPUs, or a single CPU having multiple processing cores in various embodiments. In some embodiments, a CPU 805 can be a digital signal processor (DSP). In some embodiments, CPU 805 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 825 is generally included to be representative of a random access memory (e.g., static random access memory (SRAM), dynamic random access memory (DRAM), or Flash). The storage 830 is generally included to be representative of a non-volatile memory, such as a hard disk drive, solid state device (SSD), removable memory cards, optical storage, and/or flash memory devices. Additionally, the storage 830 can include storage area-network (SAN) devices, the cloud, or other devices connected to the DSD merge manager 800 via the I/O device interface 810 or a network 850 via the network interface 815.

In some embodiments, the memory 825 stores instructions 860, a first DSD 832, second DSD 834, and merged DSD 836. Additionally, the storage 830 stores executables 838 and input/output (I/O) files 840. However, in various embodiments, the instructions 860, first DSD 832, second DSD 834, and merged DSD 836 are stored partially in memory 825 and partially in storage 830, or they are stored entirely in memory 825 or entirely in storage 830, or they are accessed over a network 850 via the network interface 815.

Instructions 860 can be processor-executable instructions for performing any portion of, or all, any of the methods of FIGS. 6 and 7A-7C and/or any of the functionality discussed in FIGS. 1-5.

The first DSD 832 and second DSD 834 can be DSDs for computer applications written in two different programming languages. The merged DSD 836 can be a merged version of the first DSD 832 and second DSD 834 that is written in one of the languages of the first DSD 832 and second DSD 834. The executables 838 can represent executables, such as the merged executables 126. The I/O files 840 can represent the source code files of the legacy and newer applications, such as the legacy applications 108 and newer applications 116.

In various embodiments, the I/O devices 812 include an interface capable of presenting information and receiving input. For example, I/O devices 812 can present information to a user interacting with DSD merge manager 800 and receive input from the user.

DSD merge manager 800 is connected to the network 850 via the network interface 815. Network 850 can comprise a physical, wireless, cellular, or different network.

In some embodiments, the DSD merge manager 800 can be a multi-user mainframe computer system, a single-user system, or a server computer or similar device that has little or no direct user interface but receives requests from other computer systems (clients). Further, in some embodiments, the DSD merge manager 800 can be implemented as a desktop computer, portable computer, laptop or notebook computer, tablet computer, pocket computer, telephone, smart phone, network switches or routers, or any other appropriate type of electronic device.

It is noted that FIG. 8 is intended to depict the representative major components of an exemplary DSD merge manager 800. In some embodiments, however, individual components can have greater or lesser complexity than as represented in FIG. 8, components other than or in addition to those shown in FIG. 8 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
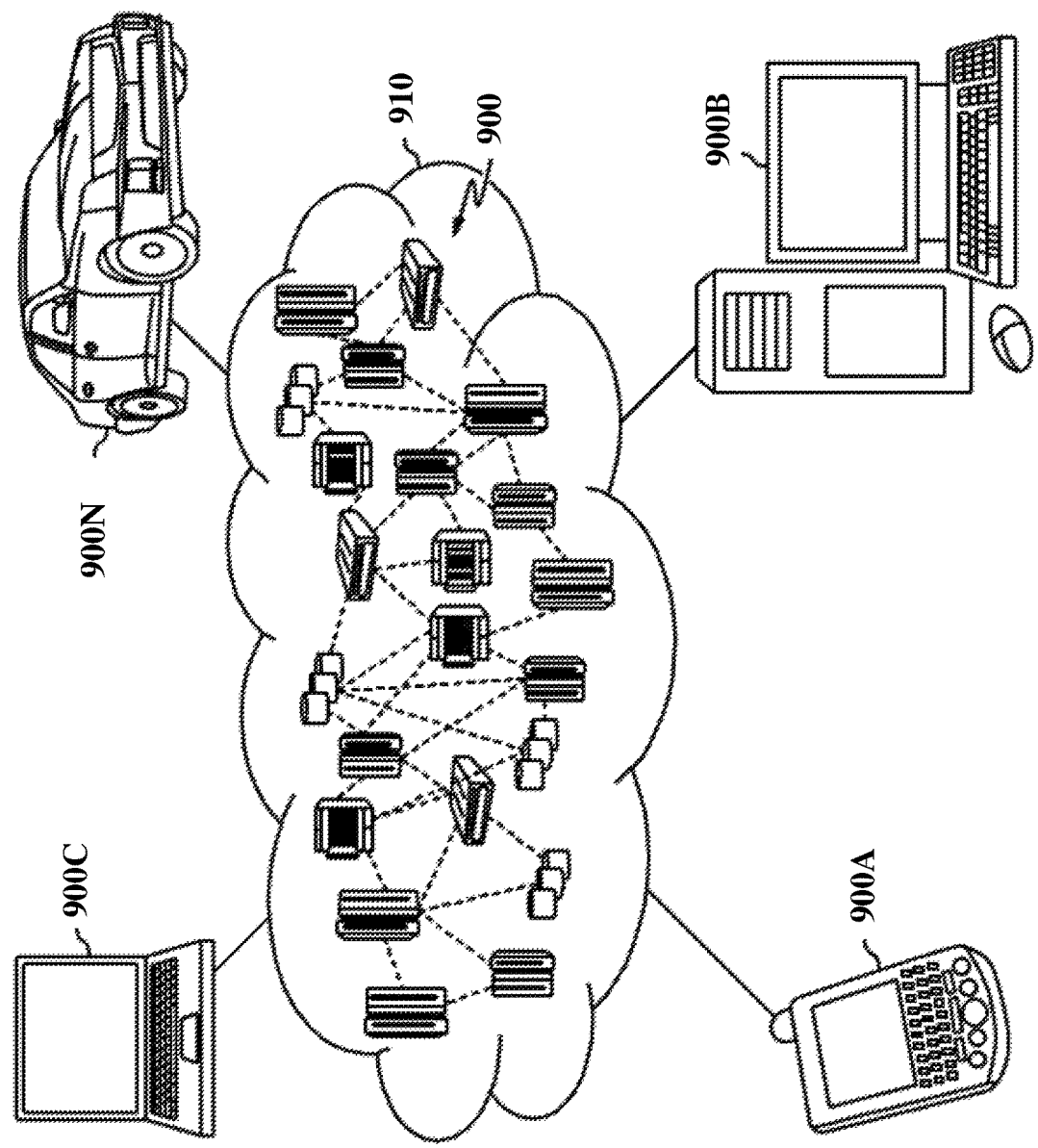
FIG. 9 is a block diagram of a cloud computing environment, according to some embodiments of the present disclosure.

FIG. 9 is block diagram of a cloud computing environment 910, according to some embodiments of the present disclosure. As shown, cloud computing environment 910 includes one or more cloud computing nodes 900. The cloud computing nodes 900 can perform the method described in FIG. 5 and/or the functionality discussed in FIGS. 1-4 and 6. Additionally, cloud computing nodes 900 can communicate with local computing devices used by cloud consumers, such as, for example, personal digital assistant (PDA) or cellular telephone 900A, desktop computer 900B, laptop computer 900C, and/or automobile computer system 900N.

Further, the cloud computing nodes 900 can communicate with one another. The cloud computing nodes 900 can also be grouped (not shown) physically or virtually, in one or more networks, such as Private, Community, Public, or Hybrid clouds as described hereinabove, or a combination thereof. This allows cloud computing environment 910 to offer infrastructure, platforms and/or software as services for which a cloud consumer does not need to maintain resources on a local computing device. It is understood that the types of computing devices 900A-N shown in FIG. 9 are intended to be illustrative only and that computing nodes 900 and cloud computing environment 910 can communicate with any type of computerized device over any type of network and/or network addressable connection (e.g., using a web browser).

Figure 10:
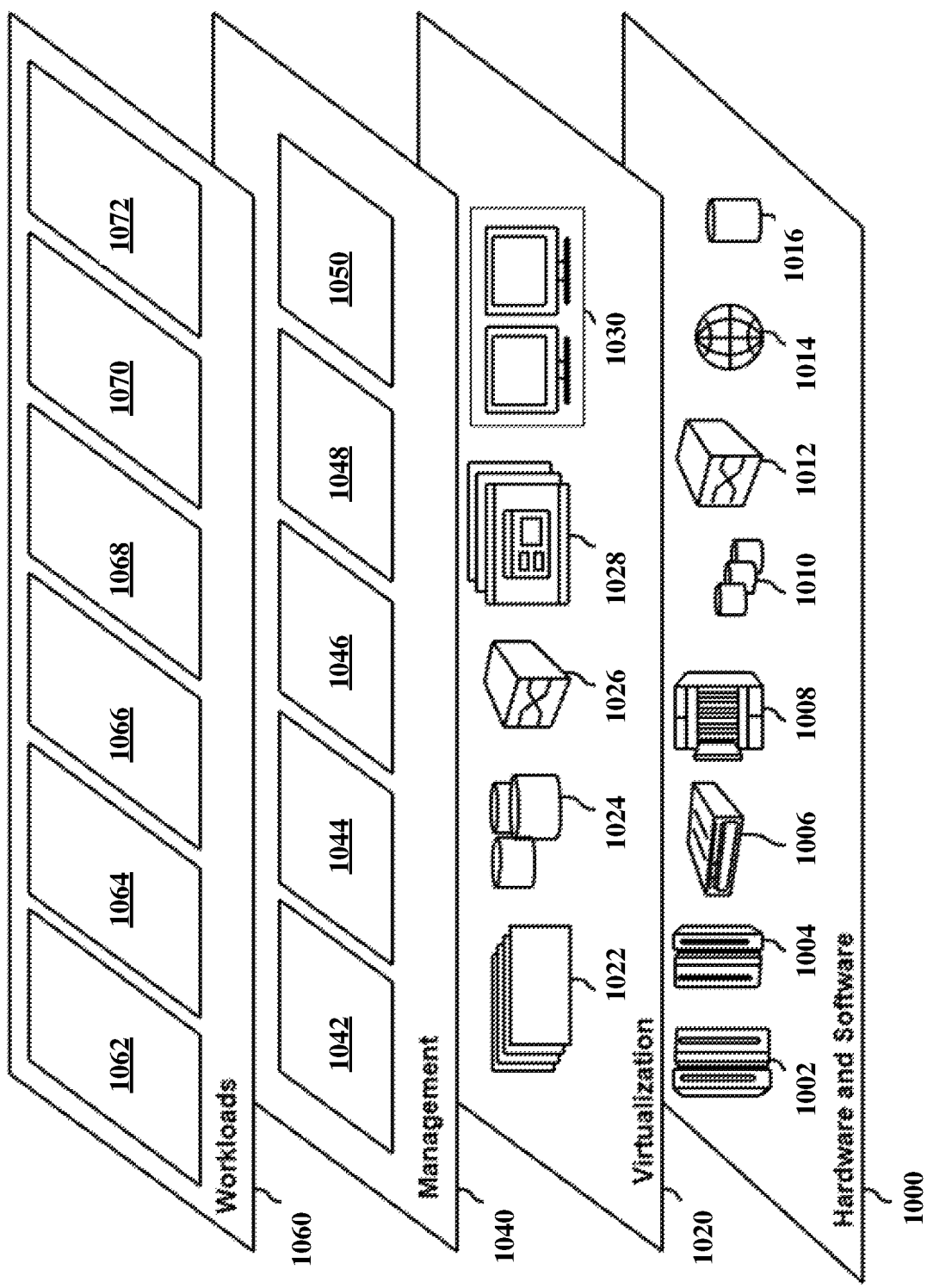
FIG. 10 is a block diagram of abstraction model layers, according to some embodiments of the present disclosure.

FIG. 10 is a block diagram of abstraction model layers provided by cloud computing environment 910 (FIG. 9), according to some embodiments of the present disclosure. It should be understood in advance that the components, layers, and functions shown in FIG. 10 are intended to be illustrative only and embodiments of the disclosure are not limited thereto. As depicted below, the following layers and corresponding functions are provided.

Hardware and software layer 1000 includes hardware and software components. Examples of hardware components include: mainframes 1002; RISC (Reduced Instruction Set Computer) architecture based servers 1004; servers 1006; blade servers 1008; storage devices 1010; and networks and networking components 1012. In some embodiments, software components include network application server software 1014 and database software 1016.

Virtualization layer 1020 provides an abstraction layer from which the following examples of virtual entities can be provided: virtual servers 1022; virtual storage 1024; virtual networks 1026, including virtual private networks; virtual applications and operating systems 1028; and virtual clients 1030.

In one example, management layer 1040 can provide the functions described below. Resource provisioning 1042 provides dynamic procurement of computing resources and other resources that are utilized to perform tasks within the cloud computing environment. Metering and Pricing 1044 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 1046 provides access to the cloud computing environment for consumers and system administrators. Service level management 1048 provides cloud computing resource allocation and management such that required service levels are met. Service level management 1048 can allocate suitable processing power and memory to process static sensor data. Service Level Agreement (SLA) planning and fulfillment 1050 provide pre-arrangement for, and procurement of, cloud computing resources for which a future requirement is anticipated in accordance with an SLA.

Workloads layer 1060 provides examples of functionality for which the cloud computing environment can be utilized. Examples of workloads and functions which can be provided from this layer include: mapping and navigation 1062; software development and lifecycle management 1064; virtual classroom education delivery 1066; data analytics processing 1068; transaction processing 1070; and DSD merge manager 1072.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
 generating a first memory layout definition written in a first programming language based on a first data structure definition comprising a first source code that is written in the first programming language;
 generating a second memory layout definition written in a second programming language based on a second data structure definition comprising a second source code that is written in the second programming language, wherein the first programming language is different from the second programming language;

merging the first memory layout definition and the second memory layout definition into a merged memory layout definition comprising the first memory layout definition written in the first programming language and the second memory layout definition written in the second programming language; and generating a merged data structure definition based on the merged memory layout definition, wherein the merged data structure definition is written in a single programming language selected from a group consisting of the first programming language and the second programming language.

2. The method of claim 1, wherein the first data structure definition and the second data structure definition are configured to reference a same data structure.

3. The method of claim 1, wherein:
the first data structure definition comprises a comment;
the first memory layout definition is generated to include the comment;
the merged memory layout definition is generated to include the comment; and
the merged data structure definition is generated to include the comment.

4. The method of claim 1, further comprising generating the merged data structure definition in the first programming language.

5. The method of claim 1, wherein merging the first memory layout definition and the second memory layout definition comprises:
preserving a first memory offset of a first variable of the first data structure definition that matches a second memory offset of a second variable of the second data structure definition; and
combining a first comment associated with the first variable with a second comment associated with the second variable.

6. The method of claim 5, wherein the first data structure definition is associated with a first computer application that is written in the first programming language, and wherein a second computer application written in the second programming language is associated with a legacy computer application, and wherein the second data structure definition is associated with the second computer application, and wherein the second computer application is associated with a newer computer application.

7. A computer program product comprising program instructions stored on a computer readable storage medium, wherein the computer readable storage medium is not a transitory signal per se, the program instructions executable by a processor to cause the processor to perform a method comprising:
generating a first memory layout definition written in a first programming language based on a first data structure definition comprising a first source code that is written in the first programming language;
generating a second memory layout definition written in a second programming language based on a second data structure definition comprising a second source code that is written in the second programming language, wherein the first programming language is different from the second programming language;
merging the first memory layout definition and the second memory layout definition into a merged memory layout definition comprising the first memory layout definition written in the first programming language and the second memory layout definition written in the second programming language; and generating a merged data structure definition based on the merged memory layout definition, wherein the merged data structure definition is written in a single programming language selected from a group consisting of the first programming language and the second programming language.

8. The computer program product of claim 7, wherein the first data structure definition and the second data structure definition are configured to reference a same data structure.

9. The computer program product of claim 7, wherein:
the first data structure definition comprises a comment;
the first memory layout definition is generated to include the comment;
the merged memory layout definition is generated to include the comment; and
the merged data structure definition is generated to include the comment.

10. The computer program product of claim 7, the method further comprising generating the merged data structure definition in the first programming language.

11. The computer program product of claim 7, wherein merging the first memory layout definition and the second memory layout definition comprises:
preserving a first memory offset of a first variable of the first data structure definition that matches a second memory offset of a second variable of the second data structure definition; and
combining a first comment associated with the first variable with a second comment associated with the second variable.

12. The computer program product of claim 11, wherein the first data structure definition is associated with a first computer application that is written in the first programming language, and wherein a second computer application written in the second programming language is associated with a legacy computer application, and wherein the second data structure definition is associated with the second computer application, and wherein the second computer application is associated with a newer computer application.

13. A system comprising:
a computer processing circuit; and
a computer-readable storage medium storing instructions, which, when executed by the computer processing circuit, are configured to cause the computer processing circuit to perform a method comprising:
generating a first memory layout definition written in a first programming language based on a first data structure definition comprising a first source code that is written in the first programming language;
generating a second memory layout definition written in a second programming language based on a second data structure definition comprising a second source code that is written in the second programming language, wherein the first programming language is different from the second programming language;
merging the first memory layout definition and the second memory layout definition into a merged memory layout definition comprising the first memory layout definition written in the first programming language and the second memory layout definition written in the second programming language; and generating a merged data structure definition based on the merged memory layout definition, wherein the merged data structure definition is written in a single programming language selected from a group consisting of the first programming language and the second programming language.

14. The system of claim 13, wherein the first data structure definition and the second data structure definition are configured to reference a same data structure.

15. The system of claim 13, wherein:
the first data structure definition comprises a comment;
the first memory layout definition is generated to include the comment;
the merged memory layout definition is generated to include the comment; and
the merged data structure definition is generated to include the comment.

16. The system of claim 13, the method further comprising generating the merged data structure definition in the first programming language.

17. The system of claim 13, wherein merging the first memory layout definition and the second memory layout definition comprises:
preserving a first memory offset of a first variable of the first data structure definition that matches a second memory offset of a second variable of the second data structure definition; and
combining a first comment associated with the first variable with a second comment associated with the second variable.

* * * * *